United States Patent
Morris et al.

[15] 3,659,708
[45] May 2, 1972

[54] SEPARATION OF DISCOLORANTS FROM CLAY

[72] Inventors: Horton H. Morris; James P. Olivier, both of Macon, Ga.; Sydney Ross, Troy, N.Y.

[73] Assignee: Freeport Sulphur Company, New York, N.Y.

[22] Filed: Nov. 4, 1968

[21] Appl. No.: 773,335

[52] U.S. Cl. .................................209/5, 23/110 P
[51] Int. Cl. .........................B03b 1/04, C01b 35/00
[58] Field of Search .................209/5, 3, 9; 210/37, 10; 23/110, 110 P; 106/72, 288

[56] References Cited

UNITED STATES PATENTS

| 1,888,701 | 11/1932 | Simcoe | 23/110 X |
| 2,147,774 | 2/1939 | Lyons | 23/110 |
| 2,509,680 | 10/1951 | Leek | 209/5 X |
| 3,371,988 | 3/1968 | Maynard | 23/110 |
| 3,432,030 | 3/1969 | Olivier | 209/5 |
| 3,442,677 | 5/1969 | Balentine | 23/110 X |
| 2,251,256 | 7/1941 | Feldenheimer | 106/288 X |
| 3,414,422 | 12/1968 | Lannicelli | 23/110 P X |

FOREIGN PATENTS OR APPLICATIONS

| 886,653 | 1/1962 | Great Britain | 23/110 |
| 1,104,281 | 2/1968 | Great Britain | 106/72 |
| 1,420,612 | 11/1965 | France | 209/10 |

Primary Examiner—Frank W. Lutter
Assistant Examiner—Robert Halper
Attorney—W. Philip Churchill

[57] ABSTRACT

A process for beneficiating a dispersed kaolin clay mass by removing from a dispersed clay mass the contaminant which causes the formation of a thin, dull layer of yellow or brownish-yellow material, commonly referred to as "scum," on surfaces of dried material containing the dispersed clay. The process comprises raising the pH of an aqueous dispersion of the clay to at least 12 and at that pH separating the insoluble clay from the solubilized discoloring contaminant.

6 Claims, No Drawings

SEPARATION OF DISCOLORANTS FROM CLAY

BACKGROUND OF THE INVENTION

1. Field of Invention

This invention is concerned with a process for minimizing the amount of discoloring material in dispersed kaolin clay which appears on the dried surfaces of material coated with the dispersed clay or with dispersed clay-containing material. The invention is particularly important for improving coatings containing dispersed clay such as paper coatings and paints. The effect of this discoloring material can be easily and dramatically demonstrated by preparing a coating color containing a dispersed clay and an adhesive (e.g., a latex adhesive as Dow latex 620), applying the coating to both sides of a glass plate and merely visually observing the dried surfaces.

2. Description of the prior art

When dispersed clays are dried, or when dispersed paper coatings or paints containing clays are dried, a thin dull layer of yellow or brownish-yellow material commonly referred to as "scum" may appear on the surface of the dried material. This scum detracts from the brightness and white appearance of the dried mineral and has, as a result, posed a serious problem especially to the clay industry. Because of the current high specifications for clay demanded by clay users in the paper and filler industries, clays which in the past have normally fulfilled their needs are now being rejected because of the presence of this scum.

Several processes have been disclosed in the patent literature for improving the brightness of clays. U. S. Pat. No. 3,353,668 discloses a process which involves incorporating a water soluble inorganic compound, which contains in its molecule readily available oxygen, into an aqueous clay slip at a pH below 5 and agitating the slip until the colored impurities in the clay are oxidized. U.S. Pat. No. 3,371,988 discloses removing titanium impurities from a clay by subjecting a slurry of clay to an overdose of peptizing agent beyond the amount necessary to achieve minimum viscosity.

U.S. Pat. No. 2,251,256 discloses an improvement in color of an aqueous clay slip by treating an aqueous suspension of a clay with a water-soluble bleaching-metal-salt of hydrosulphurous acid, said metal being replaceable to produce precipitated solids, followed by a thickening of the suspension through addition of an alkaline reagent in an amount sufficient to increase the pH of the suspension to about 10. Alternatively, a clay suspension may be subjected to successive treatments with the water-soluble bleaching-metal-salt of hydrosulphurous acid and with excess alkali up to the thickening point of the suspension. It is indicated in U.S. Pat. No. 2,251,256 that the alkaline reagent displaces the metallic radical of the hydrosulphurous acid compound to produce an insoluble material.

The above processes have inherent disadvantages since they either require the addition of external reagents, under carefully controlled conditions, which can be time consuming and expensive, or because they simply are ineffective for eliminating the scum.

OBJECTS OF THE INVENTION

It is an object of this invention to produce a dispersed clay mass and a dispersed clay-containing coating and filler whiter than conventionally processed clay material, as shown by a mere visual comparison.

It is yet another object of the invention to remove from dispersed clay that material which produces a scum on surfaces of the dried dispersed clay-containing material, and particularly on dried coatings containing dispersed clay, and to produce a material generally with improved GE brightness.

It is a further object of the invention to produce a whiter dispersed kaolin clay by a simple, efficient and economical process.

It is yet another object of the invention to allow the production of dispersed clay products at a lower cost because of the need for smaller quantities of the standard clay bleaching agents to meet stated specifications.

SUMMARY OF THE INVENTION

We have discovered that scumming is caused by discoloring organic compounds which are dispersed in naturally occurring clay. Apparently those discoloring compounds migrate to the surface as the dispersed clay or any material containing the dispersed clay is dried. We have further discovered that contrary to the teachings of the prior art, those discoloring impurities can be minimized by merely raising the pH of an aqueous dispersion of clay to at least a pH of 12 and separating the insoluble mass of clay at that pH from the solubilized discoloring contaminant. The clay, if desired, may then be subjected to conventional clay processing, e.g. bleaching with zinc or sodium hydrosulfites at a pH of about 4.

We have discovered that the discoloring impurities are absorbed at the clay surface in solutions of low pH, and so under the customary operating conditions where the clay is dewatered at an acid or near neutral pH, the discoloring impurities remain with the separated solid clay. In alkaline dispersions (pH at least 12), however, the discoloring impurities are brought into solution. The heart of the invention is the dewatering of the clay at a pH of at least 12 so that the discoloring impurities are removed with the water.

In our process clay is dispersed using conventional dispersing agents such as sodium silicate, tetrasodium pyrophosphate, sodium hexametaphosphate, sodium tripolyphosphate, sodium potassium butyl phosphate or other conventional dispersing agents to obtain maximum dispersion. The dispersed clay slurry is then subjected to a conventional procedure for removal of sand, mica and other coarse impurities. The pH of a dispersed clay slurry will usually be in the 6–8 range, depending on the dispersant used. For commercial applications of clay, dispersed clay dispersions at a pH of 6–8 are customarily used. Conventional classification (i.e. sedimentation, centrifugal classification, etc.) of the clay can also be accomplished at this point, if desired. The dispersed clay slurry (before or after cleaning and classification) is then treated with a water soluble alkaline material to raise the pH of the slurry to 12, thereby solubilizing the undesirable organic contaminant. The insoluble mass of clay is then separated from the solubilized scum-forming material at this high pH. This can be done by subjecting the aqueous clay slurry to any conventional dewatering technique, e.g. a centrifugal field in which the dispersed clay is concentrated in the underflow and the solubilized organic contaminant removed with the water in the overflow, or simply a filtration which allows separation of the solubilized material from the slurry of insoluble mineral. Alternatively, the solubilized organic contaminant may be removed by adsorption of the discoloring component on an anionic ion exchange column. The above procedures can be repeated several times as desired to achieve a complete removal of the solubilized organic material from the clay.

We also have found that by adding an alkali to neutralize the acid pH and to bring the pH of the slip to at least 12 at which pH the discoloring impurities are rendered soluble, the concentration of electrolyte in the slip is high enough to cause some flocculation of the clay, thus making its separation by centrifuge or by filtration much more easy to effect.

In the process of the invention any basic material capable of raising the pH of the clay slurry to at least 12 can be used. Illustrative of such materials are alkali metal hydroxides such as potassium hydroxide and sodium hydroxide and alkaline earth metal hydroxides such as calcium hydroxide.

In comparison with processes described in the patent literature for improving color of clay, our invention is extremely simple. It requires no addition of external oxidizing agent or peptizing agent. It is not dependent on the presence of a water-soluble bleaching-metal-salt of hydrosulphurous acid, our addition of alkali to a pH of at least 12 being carried out without requiring the presence of an external bleaching agent.

Having thus described the invention and in order to gain a better understanding of its details, the following examples are given, not by way of limitation, but merely of illustration, in order to show the invention in its more specific aspects. All percentages are by weight unless otherwise specified.

EXAMPLE I

Crude clay was slurried in water to which a dispersing agent (sodium silicate) had been added and the resulting dispersed slurry was degritted (sand, mica, etc. removed) and then passed through a centrifuge and a clay fraction was obtained having the particle size distribution shown in Table I. A portion of this degritted, centrifuged slurry was retained in its original state to serve as a control (pH 6.2 at 16 percent solids). The slurry pH of another portion was increased from 6.2 to 12.0 with sodium hydroxide and passed through a Merco Model 9 Centrifuge (Run 2). Under flow solids were 30–31 percent and overflow solids were 0.5–2.0 percent.

The underflow from Run 2 was reduced to about 15.5% solids by the addition of water. The diluted slurry was again passed through the Merco Centrifuge, with wash water being added in the Merco Centrifuge at a rate of 2 gal. water per minute as the slurry was being fed to the centrifuge at a rate of 1.17 gal./min. (Run 3).

The pH of each underflow sample (Runs 2 and 3) was then adjusted to about 4 with sulfuric acid. The samples from each of those underflows and the control were then treated with the amount of bleaching agent (zinc hydrosulfite) shown in Table I. Portions of the samples were then dispersed to maximum dispersion (as determined by adding the amount of dispersant required to give minimum viscosity) and dried in the dispersed state to determine the amount of scumming that occurred.

In yet another determination latex coating colors were prepared by blending 286 g. of a 70 percent solids slurry of the control clay sample (bleached with 5 lbs. zinc hydrosulfite per ton of clay) with 40 ml of 50 percent solids Dow 620 latex and a similar coating color was prepared using the product from Run 2 (bleached with 5 lbs. zinc hydrosulfite per ton of clay). The coating color was used to coat a glass plate (both sides coated) using a 3 mil Bird film applicator. The coatings were then dried.

The pH before centrifugation, the particle size distribution and GE brightness of the control and clay from Run Nos. 2 and 3 (unbleached and bleached) are set out in Table No. I, infra.

Table I

| Run No. | Control | No. 2 Under-25 flow | No. 3 Under flow |
| --- | --- | --- | --- |
| pH | 6.2 | 12.0 | 12.0 |
| G.E. Brightness at various bleach levels — lbs. zinc (hydrosulfite/dry ton clay) | | | |
| 3 | 87.4 | 88.1 | |
| 4 | 87.4 | 88.7 | |
| 5 | 87.7 | | 88.1 |
| 6 | 87.8 | 88.3 | |
| Particle Size Distribution (E.S.D.) — Percent below indicated size | | | |
| 5 micron | 97.0% | 98.0% | 98.5% |
| 2 micron | 83.0% | 82.0% | 83.0% |
| 1 micron | 67.0% | 64.0% | 66.0% |
| G.E. Brightness of latex coating | 78.5 | 79.3 | — |
| Chemical Analysis | | | |
| % Fe₂O₃ | 0.272 | 0.356 | — |
| % TiO₂ | 1.29 | 1.27 | — |

By mere visual observation the surfaces of the control (unbleached, and bleached) and the latex coating color prepared from the control had a very bad layer of discoloring scum. In comparison, the surfaces of both the unbleached and bleached samples of Run Nos. 2 and 3 and latex coating color from Run No. 2 sample had showed a substantial improvement. Of significance are the showings in Table I that the improved surface characteristics of the samples are not attributed to particle size deviation or decrease in $TiO_2$ or $Fe_2O_3$ content.

To establish the necessity of raising the pH of the clay slip before centrifuging in order to obtain scum reduction, a sample of a dispersed clay fraction (pH 6.2) similar to the control, supra, was passed through the Merco under conditions similar to those mentioned above. The overflow (ca. 2 percent solids) was not particularly yellow. The underflow (ca. 30 percent solids) was then acidified, bleached, dispersed and dried as outlined previously. No improvement in scum reduction was observed in the centrifuge sample.

EXAMPLE II

A dispersed clay slip at 14.9 percent solids, similar to that used in Example I, was treated with sodium hydroxide (NaOH) until the pH of the slip was 12.0. The slurry was then passed through the Merco centrifuge and a sample of the underflow was obtained (Run 1). The remainder of the underflow was diluted to 12.8 percent solids, again passed through the centrifuge and a sample of the underflow retained (Run 2). The rest of the Run 2 underflow was diluted to 15.7 percent solids and passed once more through the centrifuge and an underflow obtained (Run 3).

Samples of the starting feed material and the underflow from the various runs were adjusted to pH 4.0 ± 0.2, using sulfuric acid, and were then treated with sodium hydrosulfite (3 lb./ton dry clay equivalent). The samples were then filtered, reslurried in water at about 25 percent solids, refiltered and dried. Coatings were prepared (latex drawdown method as in Example 1) from the clays. GE brightness and particle size distribution, are set out in Table II infra. In addition, viscosity data of the samples were determined and standard casein coatings were applied to paper to ascertain whether any adverse effect on other clay properties had occurred. The resultant data, including G.E. brightness and gloss values of the casein coatings, are also set out in Table II.

TABLE II

| Material | Control | Run 1 | Run 2 | Run 3 |
| --- | --- | --- | --- | --- |
| Percent Solids of Feed | 14.9 | 14.9 | 12.8 | 15.7 |
| pH | 6.2 | 12.0 | 12.0 | 12.0 |
| Percent Solids of Underflow | — | 30.6 | 29.5 | 32.1 |
| pH of Underflow | — | — | 11.5 | 11.6 |
| Percent Solids of Overflow | — | 1.0 | 1.23 | — |
| Lbs. sodium hydrosulfite/ton dry clay | 3 | 3 | 3 | 3 |
| G.E. Brightness of Clay | 86.7 | 87.1 | 87.9 | 88.0 |
| Particle Size Distribution (E.S.D.) Percent Finer than Size shown | | | | |
| 5 microns | 97 | 97 | 97 | 98 |
| 2 microns | 81 | 83 | 80 | 83 |
| 1 microns | 63 | 65 | 60 | 64 |
| Stormer Viscosity (sec./100 rev.) at minimum viscosity and at solids shown | | | | |
| 74% | 24.4 | 20.2 | 21.8 | 25.2 |
| 72% | 15.4 | 14.2 | 14.2 | 14.0 |
| 70% | 11.8 | 11.2 | 11.0 | 12.0 |
| 65% | 8.4 | 7.8 | 8.4 | 8.5 |
| Brookfield Viscosity, (centipoise at 70% solids and No. 2 Spindle) | | | | |
| 10 RPM | 156 | 153 | 140 | 160 |
| 20 RPM | 124 | 126 | 110 | 124 |
| 50 RPM | 86 | 120 | 100 | 114 |
| 100 RPM | 108 | 140 | 121 | 155 |
| G.E. Brightness of Latex Drawdown Coated Paper Properties | 78.5 | 78.8 | 79.4 | 80.2 |
| G.E. (uncalendered) | 79.2 | 79.6 | 80.2 | 80.5 |
| Gloss (calendered sheet) | 58.5 | 60.0 | 67.5 | 68.5 |

Visual observation showed the surfaces of samples from Run Nos. 1, 2 and 3 clays, and casein and latex coatings from those samples substantially free of scum in comparison with surfaces of the control sample and latex and casein coatings from the control sample.

EXAMPLE III

A clay dispersion was prepared as outlined in Example I, except that a product of finer particle size distribution was obtained from the classification step. A portion of the dispersion at 15.5 percent solids was adjusted to pH 12.5, using NaOH, and passed almost immediately through the Merco centrifuge (Run 1). Another portion of the slurry was adjusted to pH 12.5, using NaOH, and then agitated for 24 hours before being passed through the centrifuge (Run 2). A portion of the slip used in Run 2 was treated with additional NaOH until the slip pH was 12.85 and then centrifuged (Run 3). Underflow solids from the centrifuge steps were about 30–32 percent and overflow solids were about 0.5–2.0 percent. The samples were then acidified and bleached as described in Example II. Table III, infra, lists the G.E. brightness, color measurement values, and properties of coatings (latex drawdown method as in Example 1) prepared from the control (starting feed before adjustment to pH 12.5) and from the treated materials.

TABLE III

| Material | Control | Run 1 | Run 2 | Run 3 |
| --- | --- | --- | --- | --- |
| pH | 6.2 | 12.5 | 12.5 | 12.85 |
| G.E. Brightness at various bleach levels — lbs. zinc hydrosulfite/dry ton clay | | | | |
| 3 | | 88.1 | 88.4 | |
| 4 | | 88.2 | 88.7 | |
| 5 | | 88.3 | 88.4 | |
| 6 | 87.0 | 88.4 | 89.0 | 89.3 |
| Particle Size Distribution (E.S.D.) Percent below indicated size | | | | |
| 5 microns | 99 | 99 | 99 | 99 |
| 2 microns | 96 | 95 | 95 | 95 |
| 1 microns | 81 | 79 | 79 | 80 |
| Tristimulus Values | | | | |
| Visual Efficiency | 92.4 | 92.8 | — | — |
| Color (lower number indicates whiter material) | 3.6 | 3.3 | — | — |
| Dominant Wavelength (m$\mu$) | 576 | 576 | — | — |
| Latex drawdown | 79.3 | — | 81.4 | — |
| Coated Paper Properties | | | | |
| G.E. Brightness (uncalendered) | 80.2 | — | 80.6 | — |
| Gloss (calendered) | 75 | — | 73 | — |

The control bleached and unbleached and by visual observation had a heavy layer of scum. In comparison Run Nos. 1, 2 and 3 bleached and unbleached were substantially free of scum.

EXAMPLE IV

A sample of clay similar to that used in Example III was prepared at a 16 percent solids dispersed slurry. It had a pH of 6.3. A portion was adjusted to a pH of 12.0 (Run No. 1) using sodium hydroxide (12.8 lbs. of sodium hydroxide per ton of dry clay). A second portion of the slurry with pH of 6.3 was adjusted to 12.5 (Run No. 2) (31.8 lbs. of sodium hydroxide per ton of dry clay). A third portion of that slurry was adjusted to a pH of 13.0 (Run No. 3) (102.7 lbs. of sodium hydroxide per ton of dry clay).

Samples of the above portions with pH of 12.0 (Run No. 1), 12.5 (Run No. 2) and 13.0 (Run No. 3) were then centrifuged, using a Tolhurst centrifuge (12 inch center slung, with imperforate basket) at approximately 750 G. In each of the runs, the centrifuge was initially charged and, after timed intervals, the overflow was withdrawn by means of a skimmer tube and feed added in the same amount as overflow withdrawn. Properties of the samples obtained are shown in Table IV infra.

TABLE IV

| Material | Control | Run 1 | Run 2 | Run 3 |
| --- | --- | --- | --- | --- |
| pH | 6.3 | 12.0 | 12.5 | 13.0 |
| Solids, %: | 16% | | | |
| Overflow | | 1.0 | 0.8 | 0.2 |
| Underflow | | 72.6 | 73.0 | 62.5 |
| Chemical Analysis (Underflow) | | | | |
| $TiO_2$, % | 1.41 | 1.30 | 1.45 | 1.37 |
| $Fe_2O_3$, % | 0.332 | 0.312 | 0.318 | 0.326 |
| Particle Size (M is micron) (Underflow) | | | | |
| % Below 5.0 M. | 99.0 | 98.5 | 99.0 | 99.0 |
| % Below 2.0 M. | 96.0 | 94.5 | 95.5 | 95.0 |
| % Below 1.0 M. | 81.0 | 75.0 | 81.0 | 81.0 |
| % Below 0.5 M. | 53.0 | 47.5 | 52.5 | 49.0 |

Samples of the underflow materials from centrifugation, as well as the control, were flocculated to pH 4.0 ± 0.2, using sulfuric acid and were then filtered. A portion of each filter cake was dried so that an unbleached G.E. brightness value could be obtained. Also, other portions of each of the filter cakes were dispersed to minimum viscosity, then dried in dispersed form so that the presence or absence of scum could be observed. The G.E. brightness values are given infra.

| Material | Control | Run 1 | Run 2 | Run 3 |
| --- | --- | --- | --- | --- |
| G. E. Brightness (Unbleached) | 85.9 | 87.0 | 86.4 | 86.0 |

Visual observation showed the control to have a heavy layer of scum. In comparison, the runs from pH of 12.0, 12.5 and 13.0 were substantially free of scum.

Various amounts of bleach (zinc hydrosulfite) were added (at a slurry pH value of 4) to each of the products and to the control. The samples were then filtered and dried. Various tests were performed on the samples and the results are given in Table V.

TABLE V

| Material | Control | pH 12.0 Run | pH 12.5 Run | pH 13.0 Run |
| --- | --- | --- | --- | --- |
| G.E. Brightness at Various Bleach Levels (lbs. zinc hydrosulfite per dry ton of clay) | | | | |
| 3 | 87.3 | 88.6 | 87.6 | 88.0 |
| 4 | — | 88.8 | 87.7 | 88.6 |
| 5 | 87.8 | 88.9 | 87.9 | 88.6 |
| 6 | 87.8 | 88.9 | 88.6 | 88.4 |
| Particle Size Distribution (E.S.D.) Percent below indicated size | | | | |
| 5 microns | 99 | 99 | 99 | 99 |
| 2 microns | 95 | 95 | 94 | 96 |
| 1 microns | 79 | 79 | 79 | 81 |
| G.E. Brightness of Latex Coating | 78.0 | 80.4 | 80.2 | 80.1 |
| Coated Paper Properties | | | | |
| G.E. Brightness (uncalendered) | 80.2 | 81.1 | 80.8 | 80.6 |

| | | | | |
|---|---|---|---|---|
| Gloss (calendered) Properties of Surface Coated with a Paint prepared from the samples | 77.0 | 77.8 | 77.5 | 76.7 |
| Contrast Ratio | 95.0 | 95.4 | 95.1 | 95.4 |
| Reflectance (white) | 85.8 | 86.5 | 86.1 | 86.3 |
| Chemical Analysis: | | | | |
| % $Fe_2O_3$ | 0.298 | 0.294 | 0.299 | 0.290 |
| % $TiO_2$ | 1.39 | 1.30 | 1.45 | 1.38 |

Visual observation showed the control bleached at 6 lb./ton zinc hydrosulfite level or unbleached to exhibit a heavy layer of scum. In contrast, runs from pH of 12.0, 15.5 and 13.0 unbleached or bleached as the control were substantially free of scum. The same contrasts were observed in the coatings.

EXAMPLE V

A somewhat coarser clay fraction (one similar to that used in Example I) was subjected to a series of tests as reported for in Example IV. Results are given in Table VI which specify the amount of NaOH required to reach a pH of 12.0 and 12.5, and in Table VII which lists the properties of a control sample and the samples produced through use of the process of the invention.

TABLE VI

| | pH | Lbs. NaOH/ton clay |
|---|---|---|
| As rec'd | 6.8 | — |
| | 12.0 | 10.86 |
| | 12.5 | 25.6 |

TABLE VII

| Material | | Control | pH 12.0 Run | pH 12.5 Run |
|---|---|---|---|---|
| G.E. Brightness at Various Bleach Levels | | | | |
| (Lbs. sodium | 2 | 86.0 | 88.0 | 87.6 |
| hydrosulfite per | 3 | 85.9 | 87.7 | 87.2 |
| dry ton of clay) | 4 | 85.7 | 88.1 | 87.9 |
| Particle Size Distribution (E.S.D) Percent below indicated size | | | | |
| 5 microns | | 97 | 98 | 97 |
| 2 microns | | 82 | 80 | 81 |
| 1 microns | | 65 | 63 | 65 |
| Chemical Analysis | | | | |
| % $Fe_2O_3$ | | 0.328 | 0.0336 | 0.346 |
| % $TiO_2$ | | 1.30 | 1.26 | 1.36 |

Visual observation showed the control (bleached and unbleached) to exhibit a heavy layer of scum. In contrast, runs from pH 12 and pH of 12.5 (bleached and unbleached) were substantially free of scum. The bleach level here was 4 lbs/ton zinc hydrosulfite (for the visual observation tests).

EXAMPLE VI

Some 150 tons of a fine clay fraction similar to that disclosed in Example III was obtained by preparing a dispersed slurry of crude clay, degritting the slurry, then passing the slurry through a centrifuge to obtain a clay fraction with a particle size distribution (E.S.D.) of 99 percent below 5 micron, 95 percent below two micron and 78 percent below 1 micron. The slurry (at 14 percent solids) was treated with enough sodium hydroxide (ca. 20 lbs. NaOH/dry ton clay) to raise the pH of the mixture to 12.3. The mixture was then passed through De Laval centrifuges. Overflow solids were ca. 2–4 percent. The underflow at ca. 30 percent solids, which contained most of the clay, was collected and acidified, using sulfuric acid, to a pH value of 3.8. The clay was bleached by the addition of a solution of zinc hydrosulfite (4 lbs. dry zinc hydrosulfite/ton dry clay) and then filtered on large rotary vacuum filters, with wash water being applied to the filter cake during filtration. The surface of the dried dispersed product had substantially no scum in contrast to a control sample, which had a heavy, dark scum. The G.E. brightness of the product from the slurry having a pH of 12.3 was 87.8, whereas control samples (starting feed — bleached) had brightness values ranging from 86.5 to 87.0.

EXAMPLE VII

A finer clay fraction was dispersed in water, using tetrasodium pyrophosphate as dispersant and was delaminated according to the process given in U.S. Pat. No. 3,171,718, to obtain a delaminated clay product as described in Example 10 of the referenced patent. The slurry was then treated with a solution of sodium hydroxide to raise its pH to 12.5. The basic mixture was centrifuged, using a Tolhurst basket centrifuge (12 inch center slung) with imperforate basket. An overflow (at 0.5 percent solids) was removed through use of a skimmer tube. The underflow, containing most of the clay, was diluted and enough sulfuric acid was added to lower the pH to 4. The sample thereafter was bleached in the conventional manner, using zinc hydrosulfite, filtered, reslurried in water (a washing step), re-filtered and dried. Physical properties of the treated product and of a control are given in Table VIII.

TABLE VIII

| Material | Control | Treated Product |
|---|---|---|
| pH | 6.0 | 12.5 |
| G.E. Brightness of clay at bleach level of 6 lbs. zinc hydrosulfite per dry ton clay | 87.0 | 87.8 |
| Particle Size Distribution (E.S.D.) Percent below indicated size | | |
| 5 microns | 99 | 98 |
| 2 microns | 96 | 96 |
| 1 microns | 82 | 86 |
| G.E. Brightness of Latex Coating | 80.1 | 80.8 |
| Scum | Heavy layer | Substantially free |
| Coated Paper Properties | | |
| G.E. Brightness (uncalendered) | 80.9 | 81.4 |
| Gloss (calendered) | 74.7 | 78.0 |

EXAMPLE VIII

A fine clay fraction similar to that used in Example III was dispersed in water, using sodium silicate as dispersant, and was then treated with enough potassium hydroxide to raise the pH of the slurry to 12.0. A portion of the sample was filtered and the filtrate was found to have a marked yellow color. The filtrate was passed through an ion exchange column prepared using Dowex Anion exchange resin which had previously been treated with a solution of potassium hydroxide. The yellow color was completely adsorbed on the resin while the liquid which was recovered from the column was colorless. A portion of the clay slurry at pH 12 was then passed through the column, the insoluble clay going through the column. In this case, the water of the clay slurry was colorless, indicating that the soluble yellow organic contaminant had been adsorbed by the anion exchange resin and thereby removed from the clay slurry.

Infrared study of a concentrate of the yellow organic impurity indicated the presence of aliphatic and aromatic C—H groups, a very broad adsorption band in the O—H and N—H region, adsorption in the C = O, C = C and/or C—$NH_2$ region and an adsorption band in the 1490 $cm^{-1}$ region.

EXAMPLE IX

A slurry of a clay fraction similar to the one used in Example III was prepared and the pH of the slurry was adjusted to pH 12, using sodium hydroxide. The slurry was then heated to 180° F and was then centrifuged, using the Merco centrifuge, described earlier. The clay product, obtained from the underflow, was then processed (acidified, bleached, dried) as described earlier. Physical properties of the product were compared to an untreated control and the results are shown in Table IX.

TABLE IX

| Material | Control | Treated Product |
|---|---|---|
| pH | 6.2 | 12 |
| G.E. Brightness of clay at bleach level of 6 lbs. zinc hydrosulfite per dry ton clay | 87.8 | 88.7 |
| Particle Size Distribution (E.S.D.) Percent below indicated size | | |
| 5 microns | 99 | 99 |
| 2 microns | 95 | 96 |
| 1 microns | 79 | 85 |
| G.E. Brightness of Latex Coating | 78.0 | 80.7 |
| Coated Paper (as Example III) Properties | | |
| G.E. Brightness (uncalendered) | 80.2 | 81.0 |
| Gloss (calendered) | 75.0 | 75.0 |
| Chemical Analyses | | |
| % $Fe_2O_3$ | 0.298 | 0.266 |
| % $TiO_2$ | 1.39 | 1.39 |

Visual observation showed that the control (unbleached and bleached) and latex and paper coatings from the control to have a substantial layer of scum, in contrast to the absence of the scum in the treated product (unbleached and bleached) and coatings from the treated product.

EXAMPLE X

Run a:

Six gallons of a clay fraction similar to the one used in Example III (control) at 17 percent solids were treated with sodium hydroxide to a pH of 12.0. The treated feed was agitated and heated for one hour at 180° F by using a steam heated copper coil immersed in the slip. After cooling, the slip pH was 11.8 and the solids were 21 percent. The pH was readjusted to 12.0.

The treated slip was centrifuged (batch-wise) in the Tolhurst Basket Centrifuge (Tolhurst Centrifuge, 12 inch Center Slung, with an Imperforate Basket) SN ZT-37175-A. The centrifuge RPM was set on 2100 (750 G's). After timed intervals, overflow was withdrawn by means of a skimmer tube and treated feed added back in the same amount as overflow withdrawn.

Run b:

Three gallons of the clay used in run a (control) at 18.7 percent solids were treated with sodium hydroxide to a pH of 12.0. The treated feed was conditioned in a Kady Mill. Nominal retention time in the Kady was 10 minutes and the temperature during conditioning was 60–65° C. After conditioning, the pH was 11.8. It was readjusted to pH 12.0.

The conditioned slip was centrifuged in the same manner as described for run a above.

| | Tests Before Filtration or bleaching | |
|---|---|---|
| | Run a (Heated) | Run b (Not Heated) |
| Solids, %: | | |
| Overflow | 1.2 | 1.5 |
| Underflow | 73.0 | 74.4 |

Dried dispersed samples from runs a and b were substantially free of scum. In comparison the control (starting feed) had a heavy layer of scum.

Run c:

Bleach series were made on each of the underflow products from runs a and b, supra. Samples were diluted to 23 to 28 percent solids, flocculated with sulfuric acid to 4.0 ± 0.2 and bleached ($ZnS_2O_4$) as follows:

| Pounds of Zinc Hydrosulfite Per Ton of Clay | G.E. Brightness Run a (Heated) | Run b (Unheated) |
|---|---|---|
| 3 | 86.8 | 88.0 |
| 4 | 87.6 | 88.8 |
| 5 | 87.5 | 88.5 |

The sample underflow (Run a) was divided into two parts and processed as follows:

The underflow product was diluted to 25.5 percent solids, flocculated to pH 4.0 ± 0.2, bleached at 4 lbs. per ton ($ZnS_2O_4$, filtered, dried and pulverized (Run a-1).

The second portion of underflow was diluted to 25 percent solids, flocculated and filtered. The filter cake was reslurried to 25 percent solids, pH adjusted to 4.0 ± 0.2, bleached at 4 lbs. per ton ($ZnS_2O_4$), filtered, dried and pulverized (Run a-2).

The underflow sample (Run b) was diluted to 28 percent solids, flocculated, bleached at 4 lbs. per ton ($ZnS_2O_4$), filtered, dried and pulverized (Run b-1).

Chemical analysis and paper coating tests and latex drawdowns were made. Following data were obtained:

Chemical Analysis

| | Run a-1 | Run a-2 | Run b-1 | Control (Starting Feed) |
|---|---|---|---|---|
| $SO_3$, % | 0.07 | 0.17 | 0.30 | 0.25 |
| $K_2O$, % | 0.02 | 0.014 | 0.02 | 0.003 |
| CaO, % | 0.015 | 0.01 | 0.015 | 0.018 |
| $TiO_2$, % | 1.25 | 1.24 | 1.23 | 1.39 |
| $FeO_2$, 3% | 0.365 | 0.358 | 0.33 | 0.298 |
| ZnO, % | 0.04 | 1.035 | 0.048 | 0.061 |

| | Run a-1 | Run a-2 | Run b-1 | Control (Starting Feed) |
|---|---|---|---|---|
| G.E. brightness | 88.4 | 88.3 | 88.8 | 88.0 |
| Particle Size: (M stands for micron): | | | | |
| % Below 2.0 M. | 96.5 | 96.0 | 96.0 | 94.5 |
| % Below 1.0 M. | 86.0 | 86.0 | 78.0 | 78.5 |
| % Below 0.5 M. | 58.0 | 57.0 | 50.0 | 52.0 |

Coated Paper Properties

| | Run a-1 | Run a-2 | Run b-1 | Control (Starting Feed) |
|---|---|---|---|---|
| Gloss: Cal. | 74.7 | 74.3 | 68.5 | 75.2 |
| G.E.: Uncal. | 81.0 | 81.0 | 80.4 | 80.2 |
| Cal. | 77.2 | 77.9 | 77.3 | 77.0 |
| Latex Drawdown: | 80.7 | 80.9 | 80.0 | 78.0 |

The dried dispersed bleached samples from the control and latex coating from the control had a dark scum layer. In contrast, samples processed according to the present invention and latex coatings from such samples were substantially free of scum.

EXAMPLE XI a. A 3.5 gallon sample of unbleached kaolin clay (sodium silicate dispersed) feed (18.5 percent solids at pH of 5.5; the control) was treated with potassium hydroxide (24 grams) to a pH of 12.0. The treated sample was then centrifuged in a Tolhurst Basket Centrifuge, 12 inch Center Slung, with Imperforate Basket. The centrifuge RPM was set on 2100 (750 G's). After initially charging the centrifuge, overflow was withdrawn by means of a skimmer tube and treated feed added back in the same amount as overflow withdrawn.

b. A 10 liter sample of unbleached kaolin clay (sodium silicate dispersed) feed (19.2 percent solids at pH of about 5.5) was treated with calcium hydroxide (20 grams calcium hydroxide slurried in 1 liter of water) to a pH of 12.0 and stirred for 1 hour. The treated sample was then centrifuged as described above.

c. A 10 liter sample of unbleached kaolin clay (sodium silicate dispersed) feed (19.2 percent solids at pH of about 5.5) was treated with ammonium hydroxide (1.5 liters concentrated ammonium hydroxide) to a pH of 11.5. The treated sample was then centrifuged as described above.

d. A 10 liter sample of unbleached kaolin clay (sodium silicate dispersed) feed (19.2 percent solids at pH of about 5.5) was treated with N-butylamine (300 milliliters) to a pH of 11.9. The treated sample was then centrifuged as described above.

e. A 10 liter sample of unbleached kaolin clay (sodium silicate dispersed) feed (18.5 percent solids at pH of about 5.5) was treated with sodium hydroxide (12.7 grams) and calcium hydroxide (0.1 gram) to a pH of 12.0, then centrifuged as described above.

f. A 10 liter sample of unbleached kaolin clay (sodium silicate dispersed) feed (18.5 percent solids at pH of about 5.5) was treated with sodium hydroxide (12.2 grams) to a pH of 12.0, then centrifuged as described above.

g. A 2000 gram sample of kaolin clay, bleached at 4 lbs. per ton ($ZnS_2O_4$), was slurried at 18 percent solids and dispersed with 0.2 percent sodium silicate (pH 7.0). The sample was treated with sodium hydroxide (14.6 grams) to a pH of 12.0, then centrifuged as described above.

Tests Before Filtration or Bleaching

| Sample | Base | Solids, % | |
|---|---|---|---|
| Control (pH 5.5) | | 18.5 | |
| | | O'flow | U'flow |
| a | KOH | 1.0 | 70.3 |
| b | CaOH$_2$ | 0* | 70.3 |
| c | NH$_4$OH | 0.8 | 75.0 |
| d | Butylamine | 1.2 | 74.0 |
| e | NaOH + Ca(OH)$_2$ | 1.2 | 73.0 |
| f | NaOH | 1.0 | 72.0 |
| g | NaOH (bleached clay) | 0.6 | 71.2 |

*Sample heavily flocculated. The overflow was clear.

CHEMICAL ANALYSIS U'FLOW (UNBLEACHED)

| Sample | Base | P$_2$O$_5$ | SO$_3$ | K$_2$O | CaO | TiO$_2$ | Fe$_2$O$_3$ | ZnO |
|---|---|---|---|---|---|---|---|---|
| Control | | 0.069 | 0.16 | 0.023 | 0.01 | 1.38 | 0.371 | 0.018 |
| a | KOH | 0.032 | 0.14 | 0.293 | 0.014 | 1.36 | 0.298 | 0.009 |
| b | Ca(OH)$_2$ | 0.05 | 0.075 | 0.02 | 0.58 | 1.37 | 0.392 | 0.014 |
| c | NH$_4$OH | 0.06 | 0.183 | 0.023 | 0.021 | 1.30 | 0.368 | 0.015 |
| d | Butylamine | 0.068 | 0.05 | 0.02 | 0.009 | 1.34 | 0.368 | 0.015 |
| e | NaOH+Ca(OH)$_2$ | 0.05 | 0.265 | 0.023 | 0.022 | 1.32 | 0.356 | 0.015 |
| f | NaOH | 0.044 | 0.04 | 0.021 | 0.008 | 1.32 | 0.32 | 0.015 |
| g | NaOH [1] | 0.038 | 0.186 | 0.022 | 0.01 | 1.30 | 0.321 | 0.032 |

[1] Bleached clay.

Scum Test — Unbleached

| Sample | Base | Scum |
|---|---|---|
| Control | | Bad, dark |
| a | KOH | Light scum |
| b | Ca(OH)$_2$ | Very little, if any scum |
| c | NH$_4$OH | Light scum |
| d | Butylamine | Slight scum |
| e | NaOH+Ca(OH)$_2$ | Slight scum |
| f | NaOH | Slight scum |
| g | NaOH (bleached clay) | Slight scum | h. A bleach series was conducted on each of the underflow products and control. The products were diluted to 24 to 26 percent solids with deionized water and bleached at three levels.

BLEACH SERIES, GE

| | | Sample | | | | | | |
|---|---|---|---|---|---|---|---|---|
| | | a | b | c | d | e | f | g |
| Base | Control | KOH | Ca(OH)$_2$ | NH$_4$OH | Butylamine | NaOH+Ca(OH)$_2$ | NaOH | NaOH [1] |
| Unbleached | 84.6 | 85.9 | 84.7 | 85.8 | 81.8 | 85.1 | 85.3 | 86.0 |
| 3 lbs. zinc hydrosulfite per ton | 85.1 | 87.5 | 86.6 | 86.9 | 86.6 | 86.8 | 86.2 | 87.5 |
| 4 lbs. zinc hydrosulfite per ton | 86.9 | 88.0 | 86.8 | 87.0 | 86.8 | 87.1 | 87.3 | 87.6 |
| 5 lbs. zinc hydrosulfite per ton | 86.9 | 87.7 | 86.7 | 86.0 | 87.5 | 86.9 | 87.4 | 87.5 |
| 6 lbs. zinc hydrosulfite per ton | 86.8 | | | | | | | |

[1] Bleached clay.

Each of the products and control was flocculated with sulfuric acid, with the exception of above sample (b), to a pH of 4.0 ± 0.2. The pH of sample (b) was so adjusted with hydrochloric acid (calcium chloride being much more water soluble than calcium sulfate). Each of the samples were bleached at 4 lbs. zinc hydrosulfite per ton of clay, except the control sample and sample (d). Those were bleached at 5 lbs. zinc hydrosulfite per ton of clay. After bleaching, the samples were filtered, dried and pulverized. These samples were submitted for chemical analyses and paper tests, including latex-glass drawdowns. Scum tests were also made on the finished product.

BLEACHED PRODUCTS AND CONTROL

| Base | Control | Sample a KOH | Sample b Ca(OH)₂ | Sample c NH₄OH | Sample d Butyl-amine | Sample e NaOH+ Ca(OH)₂ | Sample f NaOH | Sample g NaOH [1] |
|---|---|---|---|---|---|---|---|---|
| Paper coating data: | | | | | | | | |
| pH | 3.5 | 3.9 | 5.4 | 4.0 | 3.8 | 3.9 | 3.8 | 4.1 |
| GE brightness | 86.8 | 87.2 | 86.4 | 87.5 | 87.6 | 87.4 | 87.3 | 87.6 |
| Particle size: | | | | | | | | |
| Percent below 5.0 M | 98.0 | 99.0 | 98.5 | 98.0 | 99.0 | 99.0 | 99.0 | 98.5 |
| Percent below 2.0 M | 94.0 | 95.0 | 95.0 | 93.5 | 95.0 | 95.0 | 95.0 | 94.5 |
| Percent below 1.0 M | 80.0 | 76.0 | 79.5 | 76.0 | 76.0 | 77.0 | 81.0 | 76.5 |
| Percent below 0.5 M | 54.5 | 47.5 | 49.0 | 41.5 | 47.5 | 45.0 | 56.0 | 47.0 |
| Coated paper properties: Gloss, cal | 72.7 | 70.2 | 71.0 | 74.3 | 73.0 | 72.0 | 73.0 | 71.8 |
| GE brightness: | | | | | | | | |
| Uncal | 80.1 | 81.1 | 79.6 | 81.2 | 81.3 | 80.9 | 80.9 | 81.2 |
| Cal | 76.8 | 76.9 | 76.5 | 78.2 | 78.4 | 77.7 | 78.3 | 77.8 |
| GE brightness of latex drawdown | 77.1 | 80.1 | 77.8 | 81.6 | 80.7 | 79.7 | 79.0 | 79.8 |
| Scum test | [2] | [3] | [3] | [3] | [3] | [3] | [3] | [3] |

[1] Bleached clay.
[2] Scum—med. bad.
[3] Light scum.

Chemical analysis of the bleached products and control are listed in the following table.

BLEACHED PRODUCTS AND CONTROL CHEMICAL ANALYSIS

| Base | Control | Sample a KOH | Sample b Ca(OH)₂ | Sample c NH₄OH | Sample d Butyl-amine | Sample e NaOH + Ca(OH)₂ | Sample f NaOH | Sample g NaOH [1] |
|---|---|---|---|---|---|---|---|---|
| Percent: | | | | | | | | |
| $P_2O_5$ | 0.068 | 0.09 | 0.01 | 0.06 | 0.03 | 0.026 | 0.051 | 0.097 |
| $SO_3$ | 0.187 | 0.137 | 0.258 | 0.53 | 0.18 | 0.25 | 0.09 | 0.043 |
| $K_2O$ | 0.024 | 0.078 | 0.02 | 0.02 | 0.02 | 0.021 | 0.02 | 0.02 |
| CaO | 0.01 | 0.01 | 0.22 | 0.02 | 0.015 | 0.01 | 0.008 | 0.006 |
| $TiO_2$ | 1.46 | 1.38 | 1.39 | 1.29 | 1.30 | 1.30 | 1.33 | 1.34 |
| $FeO_3$ | 0.328 | 0.297 | 0.327 | 0.33 | 0.292 | 0.303 | 0.31 | 0.31 |
| ZnO | 0.051 | 0.027 | 0.034 | 0.034 | 0.05 | 0.045 | 0.045 | 0.053 |

[1] Bleached clay.

EXAMPLE XII a. A sample of the control from Example XI was flocculated with sulfuric acid, filtered, dried and pulverized. This served as the feed control in this Example.

A 2200 gram sample of the control was slurried to 19.2 percent solids and dispersed with 0.2 percent sodium silicate (pH 5.7). The sample was treated with sodium hydroxide (11.2 grams) to a pH of 12.0. It was then centrifuged in the Tolhurst Basket Centrifuge, 12 inch Center Slung, with Imperforate Basket, as described in Example XI.

b. A 2200 gram sample of the control was slurried to 19.6 percent solids and dispersed with 0.2 percent TSPP (pH 5.3). The sample was treated with sodium hydroxide (14.0 grams) to a pH of 12.0, then centrifuged as described in Example XI.

c. A 2200 gram sample of the control was slurried to 20.3 percent solids and dispersed with 0.2 percent Calgon, a sodium hexametaphosphate (pH 4.4). The sample was treated with sodium hydroxide (15.0 grams) to a pH of 12.0, then centrifuged as described in Example XI.

d. A 2200 gram sample of the control was slurried to 19.6 percent solids and dispersed with 0.2 percent sodium potassium butyl phosphate (pH 3.8). The sample was treated with sodium hydroxide (14.0 grams) to a pH of 12.0, then centrifuged as described in Example XI. Results from Example XII (a), (b), (c) and (d) are reported as follows:

Tests Before Filtration or Bleaching

| Sample | Added Dispersant | Solids, % O'flow | Solids, % U'flow |
|---|---|---|---|
| Control (pH 3.8) | | | |
| a | Sodium silicate | 0.4 | 70.0 |
| b | TSPP (tetra-sodium pyrophosphate) | 0.8 | 70.4 |
| c | Calgon | 1.0 | 70.0 |
| d | Sodium potassium butyl phosphate | 0.4 | 69.0 |

CHEMICAL ANALYSIS U'FLOW (UNBLEACHED)

| | Control | Sample a Sodium silicate | Sample b TSPP | Sample c Calgon | Sample d Sodium potassium butyl phosphate |
|---|---|---|---|---|---|
| Percent: | | | | | |
| $P_2O_5$ | 0.08 | 0.044 | | 0.03 | 0.044 |
| $SO_3$ | 0.10 | 0.043 | 0.19 | 0.032 | 0.174 |
| $K_2O$ | 0.025 | 0.02 | 0.023 | 0.02 | 0.021 |
| CaO | 0.01 | 0.01 | 0.01 | | 0007 |
| $TiO_2$ | 1.42 | 1.33 | 1.31 | 1.35 | 1.31 |
| $Fe_2O_3$ | 0.388 | 0.35 | 0.34 | 0.341 | 0.34 |
| ZnO | 0.019 | 0.015 | 0.015 | 0.014 | 0.015 |

Scum Tests — (Unbleached)

| Sample | Scum |
| --- | --- |
| Control | Scummed, bad |
| a | Light scum |
| b | Light scum |
| c | Light scum |
| d | Light scum | e. A bleach series was conducted on the underflow products and control. The samples were diluted to 26 percent solids with deionized water and bleached at three levels, with the exception of the control, which was bleached at four levels.

Bleach Series, G.E.

| Sample Description | Control | a | b | c | d |
| --- | --- | --- | --- | --- | --- |
| Unbleached | 85.1 | 84.3 | 85.4 | 85.2 | 84.7 |
| 3 lb. zinc hydrosulfite per ton | 85.2 | 85.9 | 86.6 | 86.0 | 85.4 |
| 4 lb. zinc hydrosulfite per ton | 86.4 | 87.2 | 87.3 | 87.7 | 87.3 |
| 5 lb. zinc hydrosulfite per ton | 86.8 | 87.4 | 87.1 | 88.0 | 87.0 |
| 6 lb. zinc hydrosulfite per ton | 87.0 | — | — | — | — |

Each of the products and control was flocculated with sulfuric acid and bleached with zinc hydrosulfite. The control bleached at 6 lbs. per ton of clay, sample a bleached at 5 lbs. per ton of clay and samples (b), (c) and (d) bleached at 4 lbs. per ton of clay. These samples were submitted to paper tests including latex-glass drawdowns and to chemical analysis. Scum tests were also determined on the bleached samples.

BLEACHED PRODUCTS AND CONTROL

| Sample | Control | b | c | d |
| --- | --- | --- | --- | --- |
| pH | 3.2 | 3.6 | 3.4 | 3.8 | 3.2 |
| G.E. Brightness | 87.1 | 87.2 | 87.5 | 88.2 | 87.3 |
| Particle Size | | | | | |
| % Below 5.0 M. | 98.0 | 98.5 | 99.0 | 98.0 | 99.0 |
| % Below 2.0 M. | 94.5 | 95.0 | 92.5 | 94.0 | 95.0 |
| % Below 1.0 M. | 81.0 | 80.0 | 78.0 | 78.0 | 80.0 |
| % Below 0.5 M. | 54.0 | 54.5 | 52.0 | 53.0 | 52.0 |

Paper Coating Data

| | | | | | |
| --- | --- | --- | --- | --- | --- |
| Gloss: Cal. G.E. Brightness | 74.2 | 71.3 | 71.7 | 72.5 | 76.3 |
| Uncal. | 79.8 | 81.3 | 81.2 | 81.5 | 81.2 |
| Cal. G.E. Brightness of latex drawdown | 76.7 | 78.1 | 78.2 | 78.0 | 76.9 |
| | 78.1 | 78.7 | 80.1 | 80.0 | 78.8 |
| Scum | scummed, not as dark as unbleached | light scum | light scum | light scum | light scum |

Chemical Analysis (Bleached)

| Sample Description | Control | a | b | c | d |
| --- | --- | --- | --- | --- | --- |
| $P_2O_5$,% | 0.085 | 0.04 | 0.056 | 0.04 | 0.052 |
| $SO_3$,% | 0.233 | 0.106 | 0.26 | 0.283 | 0.11 |
| $K_2O$,% | 0.019 | 0.02 | 0.021 | 0.02 | 0.022 |
| CaO,% | 0.01 | | 0.008 | 0.01 | 0.02 |
| $TiO_2$,% | 1.44 | 1.35 | 1.35 | 1.30 | 1.31 |
| $Fe_2O_3$,% | 0.334 | 0.33 | 0.30 | 0.307 | 0.32 |
| ZnO,% | 0.059 | 0.057 | 0.032 | 0.045 | 0.042 |

For brevity, various features have been illustrated and described in connection with a limited number of illustrative embodiments. It is intended that these features be used also in combination with features shown in other embodiments without departing from the spirit of the invention.

The terms and expressions that have been employed in the specification are used as terms of description and not of limitation, and there is no intention in the use of such terms and expressions of excluding any equivalents of the features shown and described or portions thereof, since it is recognized that various modifications are possible within the scope of the invention claimed.

What is claimed is:

1. A process for removing these discoloring contaminants associated with a kaolin clay which produce a thin dull layer of a yellow or brownish-yellow scum on the surface of dry degritted kaolin clay or coatings prepared from said degritted clay, which comprises:
   1. dispersing said degritted kaolin clay containing said scum-forming contaminants in an aqueous medium having a pH of at least 12;
   2. maintaining said clay in contact with said aqueous medium at a pH of at least 12 until said contaminants become solubilized in said medium and are thereby liberated from the clay, and;
   3. then separating by a process such as filtration, centrifugation or ion exchange the insoluble kaolin clay from the aqueous medium in which the contaminants are solubilized while maintaining the aqueous medium at a pH of at least 12, to recover a clay product characterized by a markedly decreased tendency to form a surface scum layer when said clay is dried, said process further characterized in that it produces no substantial decrease in the $TiO_2$ and $Fe_2O_3$ content of the clay.

2. Process according to claim 1 in which the separation is caused by a centrifugal field in which the dispersed clay is concentrated in the underflow and the solubilized discoloring contaminant in the overflow.

3. Process according to claim 1 in which the separation is caused by filtration of the insoluble clay.

4. Process according to claim 1 in which the separation is caused by an adsorption of the solubilized discoloring contaminant onto an anionic ion exchange resin.

5. A process for removing those discoloring contaminants associated with a kaolin clay which produce a thin dull layer of a yellow or a brownish-yellow scum on the surface of dry degritted kaolin clay or coatings prepared from said degritted clay which comprises:
   1. dispersing said degritted kaolin clay containing said scum-forming contaminants in an aqueous medium having a pH of at least 12, said medium comprising a solution selected from the group consisting of aqueous alkali metal hydroxide solutions and aqueous alkaline earth metal hydroxide solutions;
   2. maintaining said clay in contact with said aqueous medium at a pH of at least 12 until said contaminants become solubilized in said medium and are thereby liberated from the clay, and,
   3. then separating by a process such as filtration, centrifugation or ion exchange the insoluble kaolin clay from the aqueous medium in which the contaminants are solubilized while maintaining the aqueous medium at a pH of at least 12 to recover a clay product characterized by a markedly decreased tendency to form a surface scum layer when said clay is dried, said process further characterized in that it produces no substantial decrease in the $TiO_2$ and $Fe_2O_3$ content of the clay.

6. The process of claim 5 wherein said alkali metal hydroxide is selected from the group consisting of sodium hydroxide and potassium hydroxide and said alkaline earth hydroxide is calcium hydroxide.

* * * * *

UNITED STATES PATENT OFFICE
CERTIFICATE OF CORRECTION

Patent No. 3,659,708　　　　　　　　　　Dated May 2, 1972

Inventor(s) H. H. Morris et al.　　　　　　　　　-1-

It is certified that error appears in the above-identified patent and that said Letters Patent are hereby corrected as shown below:

Col. 3, line 47, after "Under-" delete "25";

Col. 6, line 57, delete "pH 12.0" over "Control";

Col. 6, line 57, insert -- pH 12.0 -- over "Run";

Col. 7, line 13, "15.5" should be -- 12.5 --;

Col. 9, line 73, delete "bleaching" over "Run b" and insert -- bleaching -- after "or";

Col. 10, line 54, "1.035" should be -- 0.035 --;

Col. 10, line 73, "Drawndown" should be -- Drawdown --;

Col. 12, line 7, "70.3" should be -- 49.0 --;

Col. 13, line 35, (in the percent table) "FeO$_3$" should be -- Fe$_2$O$_3$ --;

Col. 14, line 67, (in the sodium potassium table) "0007" should be -- 0.007 --;

Col. 15, line 43, (in the Bleached Products table) replace "b" by -- a --;

Col. 15, line 43, (in the Bleached Products table) insert letter -- b -- over numerals "3.4" in line 46;

UNITED STATES PATENT OFFICE
CERTIFICATE OF CORRECTION

Patent No. 3,659,708    Dated May 2, 1972

Inventor(s) H. H. Morris et al.

It is certified that error appears in the above-identified patent and that said Letters Patent are hereby corrected as shown below:

Col. 15, line 74, "41.44" should be -- 1.44 --;

Col. 16, line 14, "these" should be -- those --.

Signed and sealed this 9th day of January 1973.

(SEAL)
Attest:

EDWARD M. FLETCHER, JR.   ROBERT GOTTSCHALK
Attesting Officer          Commissioner of Patents